US006689957B2

(12) United States Patent
Onoda

(10) Patent No.: US 6,689,957 B2
(45) Date of Patent: Feb. 10, 2004

(54) LIQUID-BLOCKING CONNECTOR

(75) Inventor: Katsuhiko Onoda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 41 days.

(21) Appl. No.: 10/091,400

(22) Filed: Mar. 7, 2002

(65) Prior Publication Data

US 2002/0125651 A1 Sep. 12, 2002

(30) Foreign Application Priority Data

Mar. 8, 2001 (JP) ..................................... P2001-064855

(51) Int. Cl.[7] .................................................. H02G 3/22
(52) U.S. Cl. .................... 174/74 R; 174/88 R; 174/151
(58) Field of Search ............................ 174/74 R, 84 R, 174/88 R, 65 G, 151, 152 G, 77 R, 153 G; 439/551, 559

(56) References Cited

U.S. PATENT DOCUMENTS 2,247,671 A * 7/1941 Tepel .......................... 174/20
4,982,055 A * 1/1991 Pollack et al. .............. 174/151
5,170,017 A * 12/1992 Stanevich et al. ...... 174/153 G
5,631,445 A * 5/1997 Herster ....................... 174/151

FOREIGN PATENT DOCUMENTS

JP 5-61908 8/1993

* cited by examiner

*Primary Examiner*—Chau N. Nguyen
(74) *Attorney, Agent, or Firm*—Sughrue Mion, PLLC

(57) ABSTRACT

An inner plate (50) holding and positioning terminals (40) in a connector fitting direction (A) is received within a connector housing (31), and the inner plate (50) is supported for movement in a direction (B) perpendicular to the connector fitting direction. Conductor-exposed portions of wires (6) are disposed at a position spaced from the terminals, and a potting material (10) is filled and cured in such a portion of the connector housing that the wires are allowed to be deformed in accordance with the movement of the inner plate, and the conductor-exposed portions are sealed in the filled and cured potting material (10). Guide portions (55) for guiding the terminals so as to properly fit these terminals relative to respective terminals of a mating connector (80) are provided at the inner plate.

5 Claims, 6 Drawing Sheets

PRIOR ART

PRIOR ART

LIQUID-BLOCKING CONNECTOR

BACKGROUND OF THE INVENTION

This invention relates to a liquid-blocking connector which is mounted, for example, on an automatic transmission casing (A/T casing) for an automobile, and is used to electrically connect an electrical part within the automatic transmission casing to an external electronic control unit (ECU).

FIGS. 5 and 6 show an example of use of a related liquid-blocking connector of the type described. In FIG. 5, reference numeral 1 denotes an A/T casing, reference numeral 1A a connector mounting hole, reference numeral 2 a female connector serving as the oil-blocking connector (liquid-blocking connector), and reference numeral 7 a male connector serving as a mating connector. The female connector 2 is fixed to the A/T casing 1, with its lower portion 3 fitted liquid-tight in the connector mounting hole 1A through an O-ring 4.

In this case, in order to secure an oil-blocking performance in the interior of the female connector 2, gaps between wires 6 extending from respective terminals 5 and a connector housing 2A are sealed by a packing 9, as shown in FIG. 6. A potting material (adhesive sealing material) 10 is filled in the connector housing 2A, and is cured such that those portions (conductor-exposed portions) 6*a* of the wires 6, connected respectively to the terminals 5, are buried in this potting material, and as a result the leakage of oil from the interior of the A/T casing to the exterior through internal gaps, existing in the wires 6, is prevented.

The male connector 7 is connected to an ECU via lead wires 8. When the female and male connectors 2 and 7 are fitted together, an electrical part within the A/T casing 1 is electrically connected to the ECU. In this case, the connector 7, connected to the ECU, is secured to distal ends of the lead wires 8, so that the position of this connector can be suitably adjusted, and therefore the female and male connectors 2 and 7 can always be fitted together satisfactorily.

Recently, it has been desired to mount the connector 7 directly on a board 13 of an ECU 12 while omitting the use of the lead wires, as shown in FIG. 6.

However, in the related connector 2 mounted on the A/T casing 1, the positions of the terminals 5 are completely fixed by the potting material 10, and therefore there was a possibility that the connector 2 could not be properly fitted relative to the mating connector 7 if the terminals 5 were disposed out of the suitable position with respective terminals of the mating connector 7.

SUMMARY OF THE INVENTION

With the above circumstances in view, it is an object of this invention to provide a liquid-blocking connector which can maintain a sealing performance, secured by a filled and cured potting material, and besides can keep a good ability of fitting relative to a mating connector even if a misregistration is encountered.

In order to solve the aforesaid object, the invention is characterized by having the following arrangement.

(1) A liquid-blocking connector comprising:

- a connector housing for receiving a mating connector in a fitting direction;
- a inner plate accommodated in and supported by the connector housing so that movement of the inner plate is prevented in the fitting direction and allowed in a direction substantially perpendicular to the fitting direction;
- a terminal held by the inner plate;
- a wire connected to the terminal and including a conductor-exposed portion disposed at a position spaced from the terminal;
- potting material which is filled and cured in such a portion of the connector housing that the wire is allowed to be deformed according to the movement of the inner plate and seals the conductor-exposed portion; and
- a guide portion, for guiding the mating connector into the connector housing so that the terminal is connected to a mating terminal of the mating connector, provided to the inner plate.

(2) The liquid-blocking connector according to (1) further comprising:

- a packing, for sealing gaps between the wire and the connector housing, fitted in a portion between the inner plate and the portion in which the potting material is filled.

(3) The liquid-blocking connector according to (2), wherein a space is defined between the packing and the inner plate.

(4) The liquid-blocking connector according to (2), wherein the potting material is filled in a space defined by the packing and the connector housing.

(5) The liquid-blocking connector according to (1), wherein the connector housing is provided with an opening end portion, wherein a clearance for allowing movement between the connector housing and the mating connector is provided between the opening end portion and the mating connector when the connector housing receives the mating connector.

According to the above arrangement, if this liquid-blocking connector and the mating connector are offset relative to each other in the direction perpendicular to the connector fitting direction, the guide portions are guided into the mating connector when the two connectors are fitted together, and as a result the inner plate is moved in accordance with this guiding operation, and therefore the terminals and the mating terminals are brought into their respective proper fitting positions. At this time, the terminals are spaced from the position where the wires are fixed by the filled potting material, and the wires can be freely flexed in this spacing, and therefore the free movement of the inner plate will not be inhibited. Therefore, the connector can maintain the sealing performance, secured by the filled and cured potting material, and besides can keep a good ability of fitting relative to the mating connector even if a misregistration is encountered. As a result, the connector-fitting reliability can be enhanced, and besides the low insertion-force design of the connector (by which the connector can be fitted with a small insertion force) can be achieved.

The wires are held in the predetermined position by the packing, and in this condition the potting material can be filled and cured. And besides, a space, in which the potting material is to be filled, can be formed by the packing, and therefore the filling operation can be carried out easily, and in addition the quality can be enhanced.

DETAILED DESCRIPTION OF PREFERRED EMBODIMENTS

A preferred embodiment of the present invention will now be described with reference to the drawings.

Figure 1:
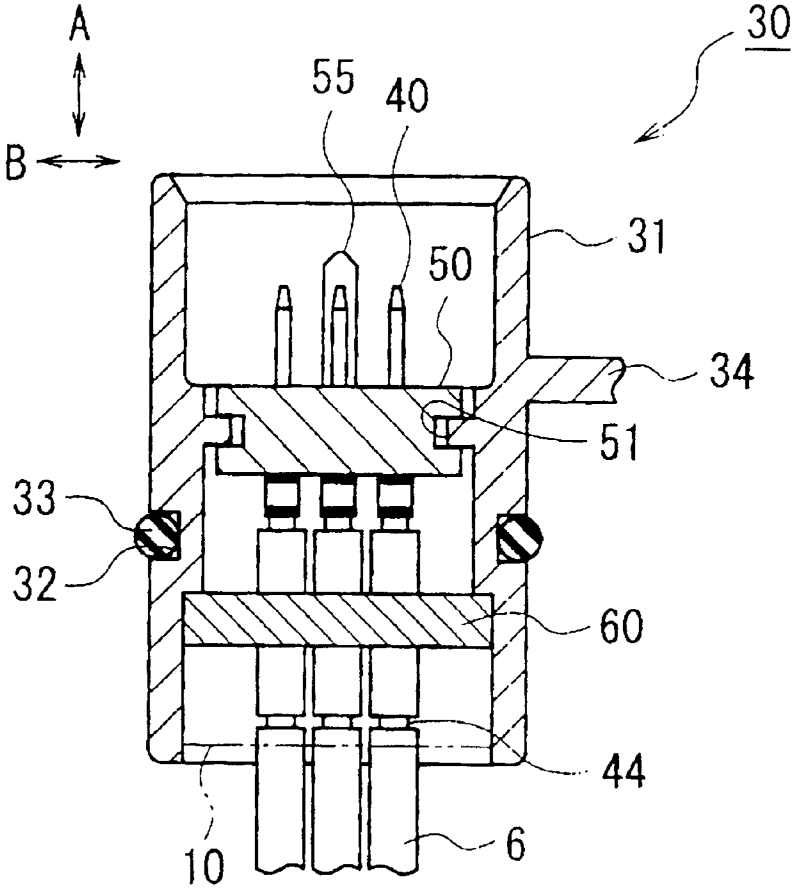
FIG. 1 is a cross-sectional view of a preferred embodiment of a liquid-blocking connector of the present invention, showing a condition before a potting material is filled in this connector.
Figure 2:
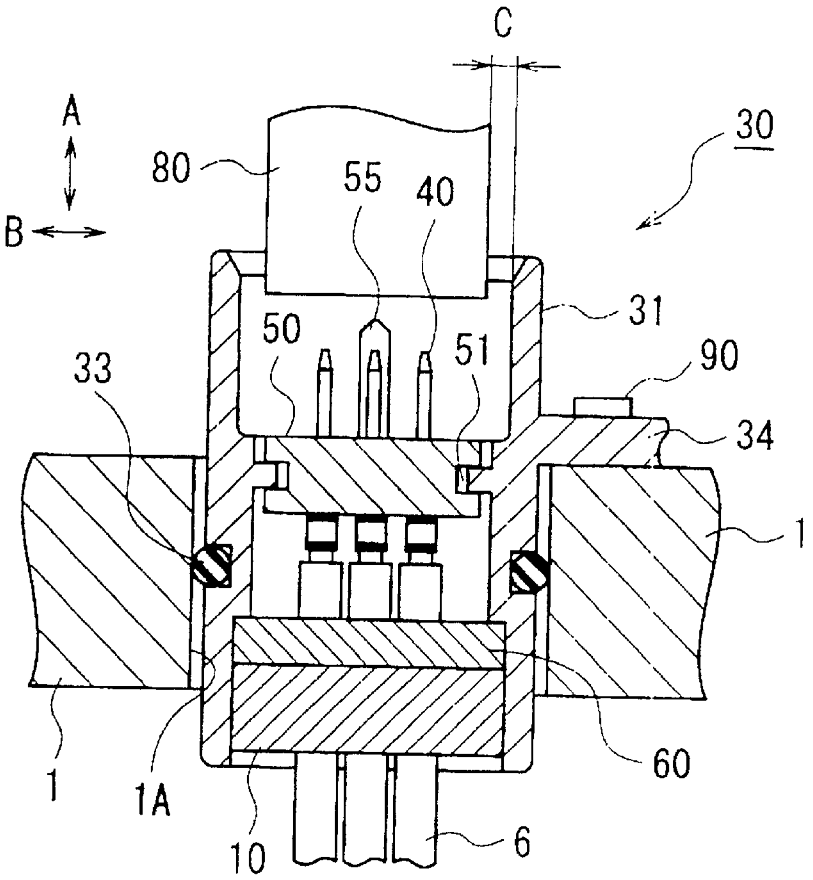
FIG. 2 is a cross-sectional view showing a condition in which the liquid-blocking connector of the embodiment, completed by filling the potting material, is mounted on an A/T casing.
Figure 3:
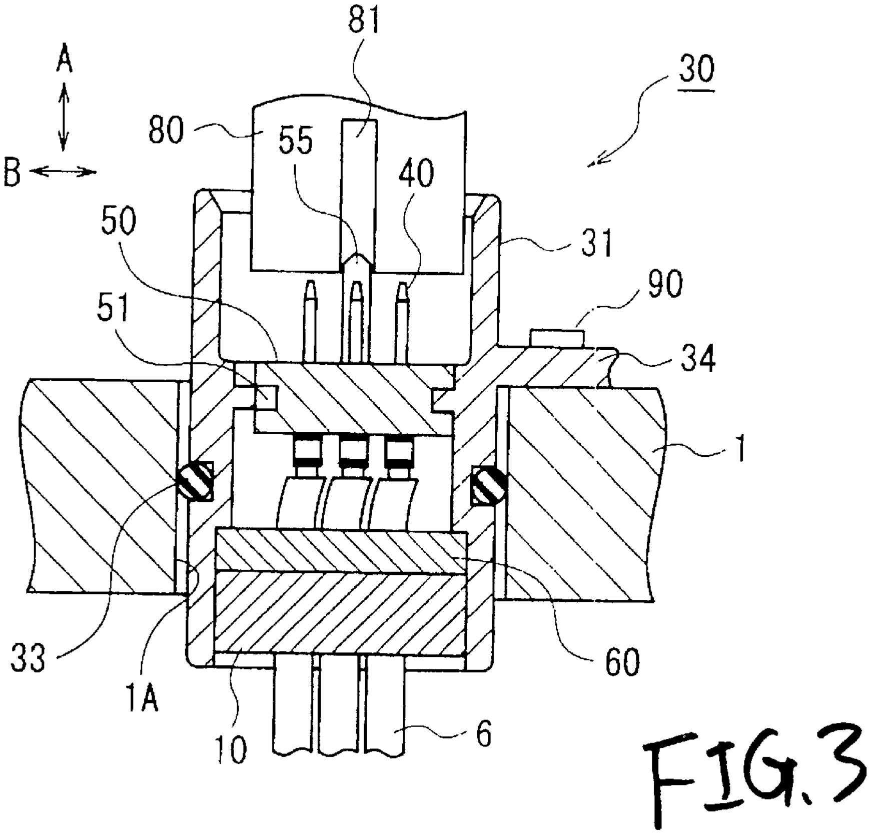
FIG. 3 is a cross-sectional view showing an operation for fitting the connector on an ECU-side connector.
Figure 4A:
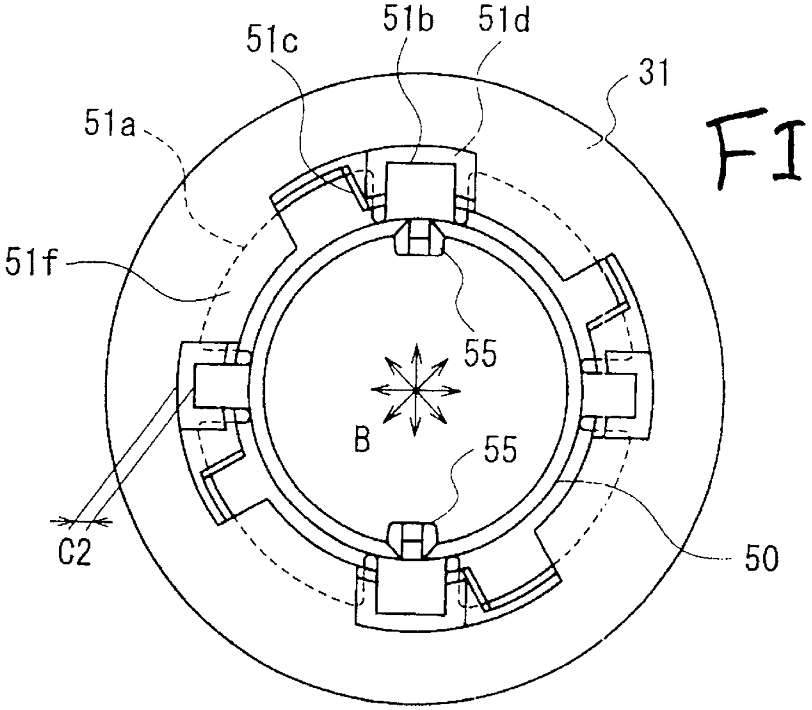
FIG. 4A is a view of an engagement structure, by which an inner plate and a connector housing are engaged with each other, as seen from the upper side.
Figure 4B:
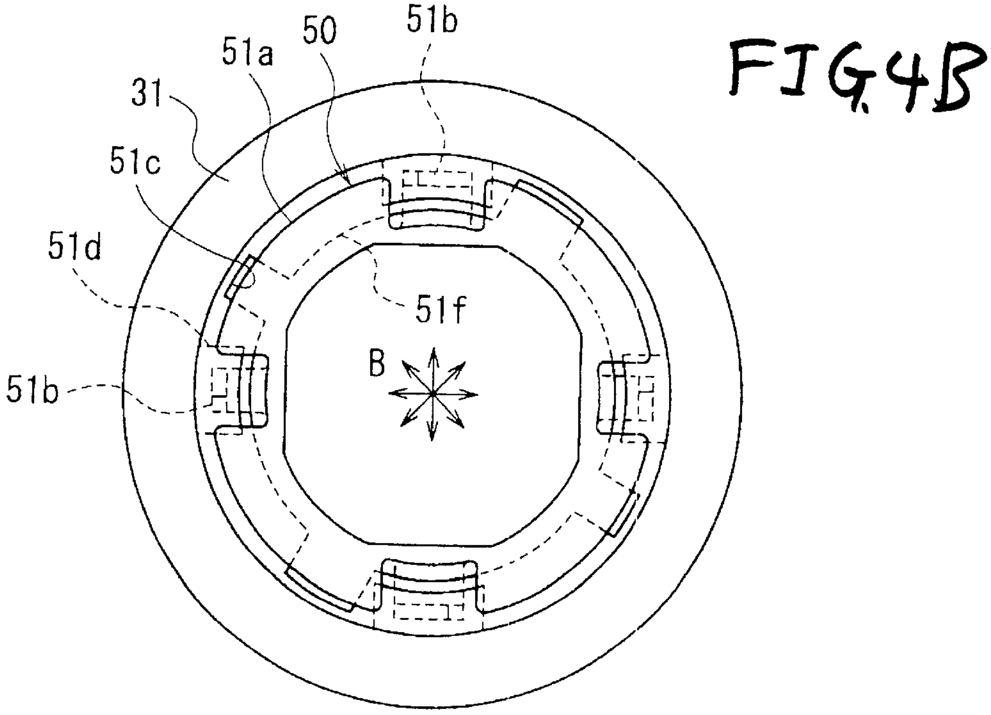
FIG. 4B is a view of this engagement structure as seen from the lower side.
Figure 5:
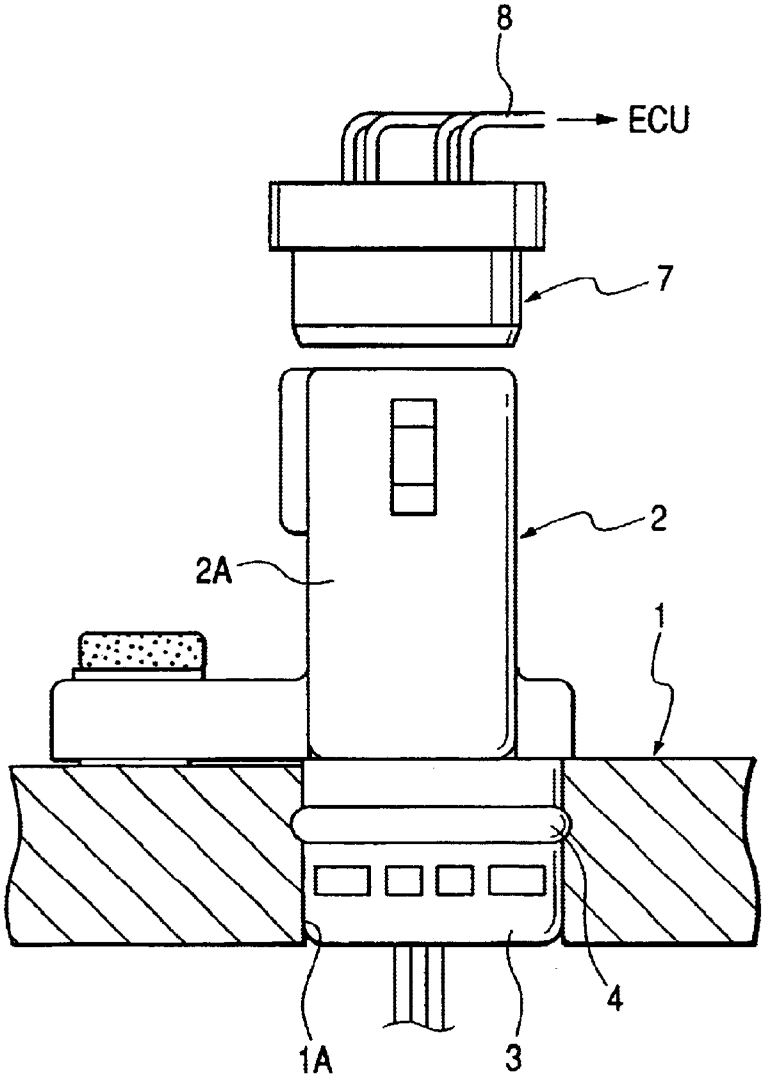
FIG. 5 is a side-elevational view of a conventional liquid-blocking connector.
Figure 6:
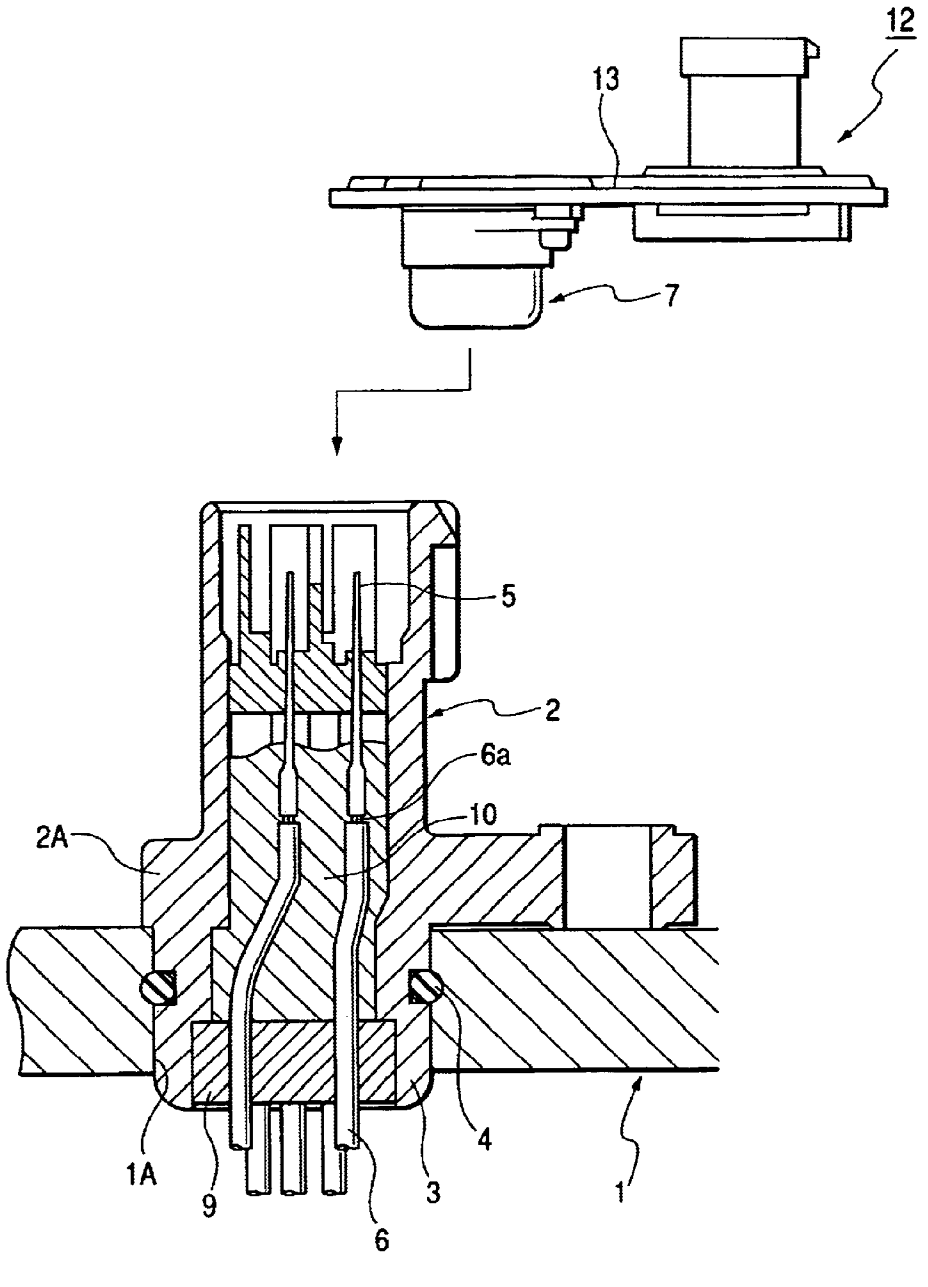
FIG. 6 is a side-elevational view explanatory of a problem encountered when fitting the conventional liquid-blocking connector on a mating connector.

FIG. 1 is a cross-sectional view of the liquid-blocking connector according to the embodiment, showing a condition before a potting material is filled in this connector, FIG. 2 is a cross-sectional view showing a condition in which the liquid-blocking connector, completed by filling the potting material, is mounted on an A/T casing, FIG. 3 is a cross-sectional view showing an operation for fitting the connector on an ECU-side connector, FIG. 4A is a view of an engagement structure, by which an inner plate and a connector housing are engaged with each other, as seen from the upper side, and FIG. 4B is a view of this engagement structure as seen from the lower side.

In this liquid-blocking connector 30, male terminals 40 fixedly secured respectively to wires 6, and the inner plate 50 which holds and positions the terminals 40 in a connector fitting direction (direction of arrow A) are received within the female connector housing 31, the inner plate 50 being supported for movement in a direction (direction of arrow B) perpendicular to the connector fitting direction A.

The engagement structure 51, by which the inner plate 50 and the connector housing 31 are engaged with each other, is provided as shown in FIGS. 4A and 4B. Specifically, an outer peripheral surface of the inner plate 50 is stepped in the direction of its height such that lower projecting piece portions 51*a* and upper projecting piece portions 51*b* are formed at this outer peripheral surface. The four upper projecting piece portions 51*b* are provided at intervals of 90 degrees in the circumferential direction. The lower projecting piece portions 51*a* have an arcuate shape, and are provided in such a manner that each lower projecting piece portion 51*a* extends generally between the corresponding adjacent upper projecting piece portions 51*b*.

Notches 51*c* for respectively passing the upper projecting piece portions 51*b* therethrough upwardly from the lower side are formed in a limitation wall 51*f* formed on the inner peripheral surface of the connector housing 31. Shelf plate portions 51*d* are formed at this limitation wall 51*f*. The upper projecting piece portions 51*b*, passed respectively through the notches 51*c*, can rest respectively on these shelf plate portions 51*d* when the inner plate 50 is rotated. The inner plate 50 is engaged with the connector housing 31 by following manner: the upper projecting piece portions 51*b* are positioned with respect to the notches 51*c*, respectively, and in this condition the inner plate 50 is lifted, thereby passing the upper projecting piece portions 51*b* through the notches 51*c*, respectively, and in this condition in which the upper projecting piece portions 51*b* are passed respectively through the notches 51*c*, the inner plate 50 is rotated, thereby causing the upper projecting piece portions 51*b* to rest respectively on the shelf plate portions 51*d*.

In this case, a clearance C2 for allowing the inner plate 50 to move relative to the connector housing 31 in the direction B perpendicular to the connector fitting direction is formed between the connector housing 31 and the inner plate 50. The lower projecting piece portions 51*a* are held against the lower side of the limitation wall 51*f*, and the upper projecting piece portions 51*b* are held against the upper side of the limitation wall 51*f*, therefore the inner plate 50 is held against movement in the connector fitting direction.

Accordingly, the inner plate 50 holding the terminals 40 is supported within the connector housing 31 so as to move in the direction B, and therefore a relatively-large clearance C for absorbing a fitting deviation of a mating connector 80 is formed at an open end portion of the connector housing 31 as shown in FIG. 2.

A packing 60 is fitted in that portion of the connector housing which is disposed inwardly of a region where the potting material 10 is filled and cured, and therefore is disposed closer to the terminals 40 than the potting material is. As shown in FIG. 1, conductor-exposed portions 44 of the wires 6 (at each of which a sheath is removed from the wire 6 to thereby expose a conductor in the wire), are disposed at a position spaced from the terminals 40. The potting material 10 is filled and cured in such a portion of the connector housing 31 that the wires 6 are allowed to be deformed in accordance with the movement of the inner plate 50 in the direction B, and the conductor-exposed portions 44 are sealed in this potting material 10. An epoxy resin, a silicone, urethane or the like is used as the potting material 10.

A rib 55 is formed on and project from the inner plate 50, and the rib 55 serves as guide portions for guiding the terminals 40, held by the inner plate 50 so as to properly fit these terminals relative to corresponding terminals of the mating connector 80, respectively. An O-ring groove 32 is formed in the outer peripheral surface of the connector housing 31, and an O-ring 33 is mounted in this groove. A mounting piece portion 34 is formed on and projects from the outer peripheral surface of the connector housing 31, and the liquid-blocking connector 30 can be fixedly secured by screws 90 to the A/T casing 1 through this mounting piece portion.

For assembling the liquid-blocking connector 30, first, the wires 6 are passed through the packing 60, and the terminals 40 are press-fastened to the distal ends of the wires 6, respectively, and the terminals 40 are press-fitted in the inner plate 50, as shown in FIG. 1. Then, the inner plate 50, having the terminals 40 attached thereto, is fitted into the connector housing 31 having the O-ring 33 mounted thereon. The fitting procedure is as described above. Simultaneously when the inner plate 50 is thus fitted into the connector housing, the packing 60 is forced into its fixed position. The conductor-exposed portions 44, each formed by removing the sheath, are beforehand formed at those portions of the wires 6 which are to be disposed rearwardly of the region where the packing 60 is mounted. After the packing 60 is forced into the predetermined position, the connector housing 31 is held in an upside-down (inverted) posture (reverse to that shown in FIG. 1), and in this condition the potting material 10 is filled in the space in the rear end portion (the upper end portion in the inverted condition) of the connector housing 31, and is cured. As a result, the potting material 10 flows into gaps between conductor elements of each conductor-exposed portion 44, so that internal gaps in each of the sheathed wires 6 are sealed.

At this time, the wires 6 are held in the predetermined position by the packing 60, and in this condition the potting material 10 can be filled and cured. The space in which the potting material 10 is to be filled can be formed by the packing 60. Therefore, the filling operation can be carried out easily, and in addition the quality can be enhanced.

Thereafter, the completed liquid-blocking connector 30 is fitted into a mounting hole 1A in the A/T casing 1, and is fixed by the screws 90 as shown in FIG. 2, thus completing the mounting operation.

If this liquid-blocking connector 30 and the mating connector 80, directly connected to the ECU, are offset relative to each other in the direction B, perpendicular to the connector fitting direction, the rib 55 is guided respectively into guide grooves 81 in the mating connector 80 as shown in FIG. 3 when the two connectors 30 and 80 are fitted together. As a result the inner plate 50 is moved (right in the illustrated embodiment) in accordance with this guiding operation, and therefore the terminals 40 and the mating terminals (not shown) are brought into their respective proper fitting positions.

At this time, the terminals 40 are spaced from the position where the wires 6 are fixed by the filled potting material 10, and the wires 6 can be freely flexed in this spacing, thereby the inner plate 50 can freely move. Therefore, the sealing performance can be secured by the filled and cured potting material 10, and besides the two connectors 30 and 80 can be satisfactorily fitted together while absorbing a position displacement of the two connectors relative to each other. As a result the connector-fitting reliability can be enhanced, and besides the low insertion-force design of the connector can be achieved.

As described above, according to the present invention, the connector can maintain the sealing performance, secured by the filled and cured potting material, and besides can keep the good ability of fitting relative to the mating connector even if a misregistration of the connector relative to the mating connector is encountered, and the connector-fitting reliability can be enhanced, and besides the low insertion-force design of the connector can be achieved.

Further according to the present invention, the space, in which the potting material is to be filled, can be formed by the packing, and besides the potting material can be filled and cured while holding the wires in the predetermined position by the packing. Therefore, the filling operation can be carried out easily, and in addition the quality can be enhanced.

What is claimed is:

1. A liquid-blocking connector comprising:

a connector housing for receiving a mating connector in a fitting direction;

an inner plate accommodated in and supported by the connector housing so that movement of the inner plate is prevented in the fitting direction and allowed in a direction substantially perpendicular to the fitting direction;

a terminal held by the inner plate;

a wire connected to the terminal and including a conductor-exposed portion disposed at a position spaced from the terminal;

potting material which is filled and cured in such a portion of the connector housing that the wire is allowed to be deformed according to the movement of the inner plate and seals the conductor-exposed portion; and a guide portion, for guiding the mating connector into the connector housing so that the terminal is connected to a mating terminal of the mating connector, provided to the inner plate.

2. The liquid-blocking connector according to claim 1 further comprising:

a packing, for sealing gaps between the wire and the connector housing, fitted in a portion between the inner plate and the portion in which the potting material is filled.

3. The liquid-blocking connector according to claim 2, wherein a space is defined between the packing and the inner plate.

4. The liquid-blocking connector according to claim 2, wherein the potting material is filled in a space defined by the packing and the connector housing.

5. The liquid-blocking connector according to claim 1, wherein the connector housing is provided with an opening end portion, wherein a clearance for allowing movement between the connector housing and the mating connector is provided between the opening end portion and the mating connector when the connector housing receives the mating connector.

* * * * *